United States Patent [19]
Ingvarsson et al.

[11] Patent Number: 6,046,666
[45] Date of Patent: Apr. 4, 2000

[54] THERMAL ACTUATOR

[75] Inventors: Leif Ingvarsson, Linköping, Sweden; Patrick Andre, Seyssinet, France

[73] Assignees: Damixa A/S, Odense NO, Denmark; Dauphinoise Thomson, Grenoble, France

[21] Appl. No.: 09/091,776

[22] PCT Filed: Dec. 22, 1995

[86] PCT No.: PCT/SE95/01580

§ 371 Date: Aug. 17, 1998

§ 102(e) Date: Aug. 17, 1998

[87] PCT Pub. No.: WO97/23740

PCT Pub. Date: Jul. 3, 1997

[51] Int. Cl.[7] .......................... H01H 37/36; H01H 37/40; H01H 37/44; F24F 11/053
[52] U.S. Cl. .......................... 337/306; 337/382; 337/396; 236/42; 236/95
[58] Field of Search .............................. 337/31, 123, 139, 337/141, 298, 382, 393, 394, 395–397, 306, 324; 236/41, 60, 87, 96, 43, 5, 19, 33, 66, 101, 42, 95

[56] References Cited

U.S. PATENT DOCUMENTS

| | | | |
|---|---|---|---|
| 3,768,728 | 10/1973 | Blank | 236/12 |
| 4,000,849 | 1/1977 | Wagner et al. | 236/100 |
| 4,070,859 | 1/1978 | Sobecks | 60/530 |
| 4,296,770 | 10/1981 | Rice | 137/62 |
| 4,416,416 | 11/1983 | Maltby | 236/86 |
| 5,505,706 | 4/1996 | Manus et al. | 604/131 |
| 5,582,138 | 12/1996 | Ziolek et al. | 123/41.1 |
| 5,738,658 | 4/1998 | Manus et al. | 604/151 |

FOREIGN PATENT DOCUMENTS

| | | | |
|---|---|---|---|
| 0663633 A2 | 7/1995 | European Pat. Off. | G05D 23/00 |
| 2731475 | 9/1996 | France | F03G 7/06 |
| 4237435 | 5/1994 | Germany . | |
| 338888 | 9/1971 | Sweden . | |
| 2108663 | 5/1983 | United Kingdom | G01K 5/32 |
| 2176268 | 12/1986 | United Kingdom . | |
| 2194047 | 2/1988 | United Kingdom | G01K 11/04 |
| 2203646 | 10/1988 | United Kingdom | A62C 3/14 |
| 2224120 | 4/1990 | United Kingdom | G01K 5/32 |

*Primary Examiner*—Gerald Tolin
*Assistant Examiner*—Anatoly Vorthan
*Attorney, Agent, or Firm*—Jacobson, Price, Holman & Stern, PLLC

[57] ABSTRACT

A known thermal actuator includes a capsule, which contains a diaphragm controlling the position of a stem. A thermal expansion substance like wax is contained in the capsule which operates as a thermostat in a thermostatically controlled valve such as a thermostatically controlled mixing valve. The stem of the actuator is connected with a valve body movable between two valve seats for a hot and cold medium, respectively, and the capsule is placed in the area of the mixed medium for transmitting the heat of the mixed medium to the thermal expansion substance. In order to present a simple and more effective actuator that can react promptly at changes of temperature and which does not require an extra temperature sensor, the capsule includes an oblong cuplike sensor body, the surface of which is at least partly deformed in such a way that its thermal transmittance area is increased.

13 Claims, 3 Drawing Sheets

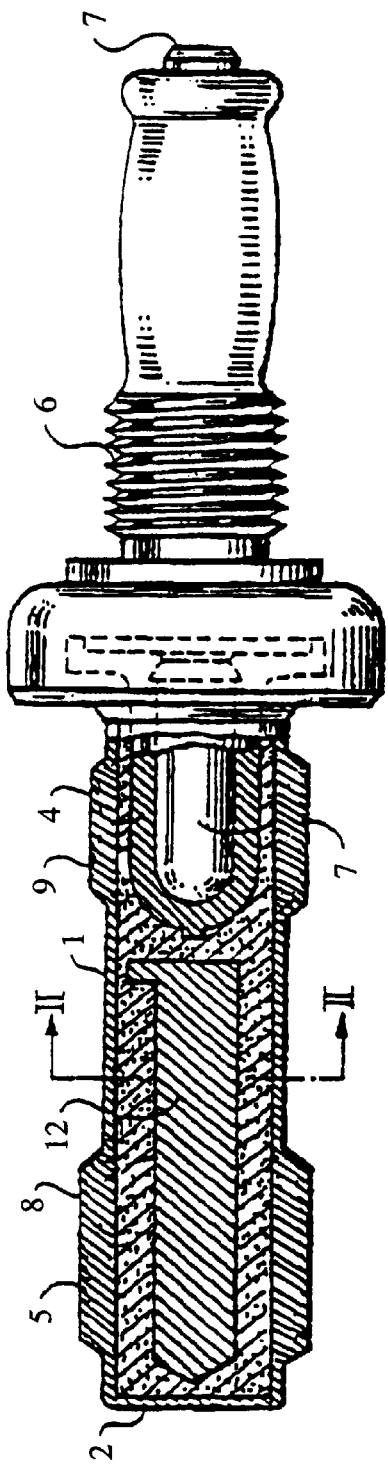
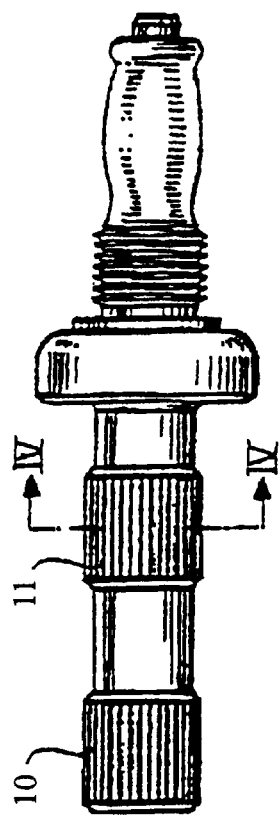
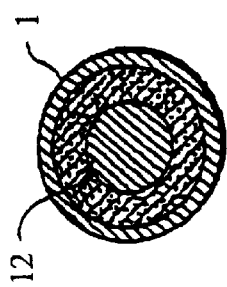

FIG. 14
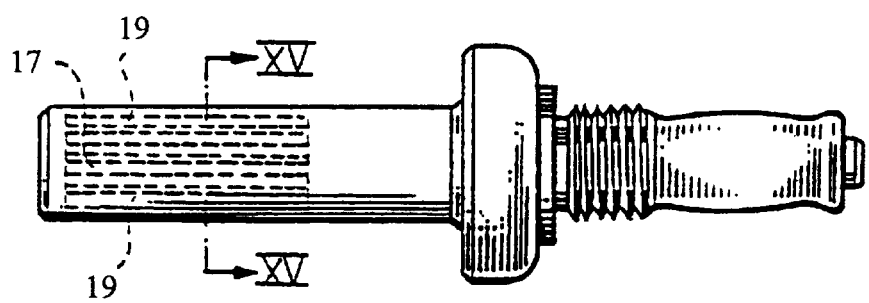
FIG. 15
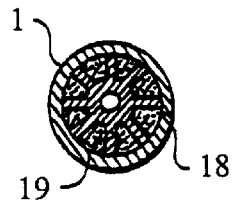
FIG. 16
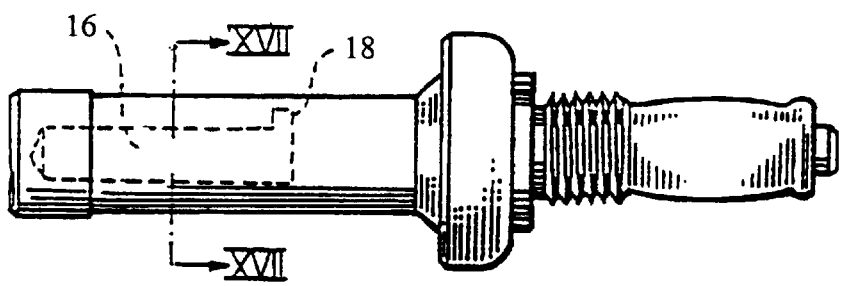
FIG. 17
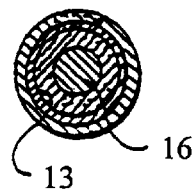
FIG. 6'  FIG. 8'  FIG. 17'
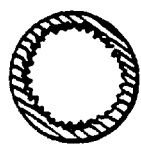 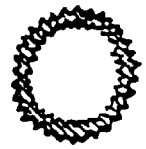 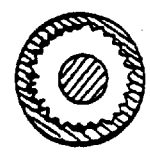

THERMAL ACTUATOR

The invention relates to a thermal actuator having a capsule which contains a thermal expansion substance like wax and which operates as a thermostat in a thermostatic controlled valve, a such as a thermostatic mixing valve where the actuator is connected with a valve body movable between two valve seats for the hot and cold medium, respectively, and where the thermostat including the capsule with the expansion substance is placed in the area of the mixed medium and provided with a temperature sensor body having a big surface to improve the measuring of the medium's present mixing temperature.

An actuator like this is known from DE 42 37 435 A1 and relates to a thermal actuator having a capsule that contains the thermal expansion substance like wax where the capsule is provided with a cover-like extension, arranged outside but thermally connected with the part of the capsule containing wax. The aim is to reach a better and more precise measuring of the present temperature of the mixed water. In this way an improved control and response to the pressure and changes of temperature of the admitted cold and hot water can be reached.

By the above known device it is also possible to supply the wax capsule with for example a threaded socket where a body with a big surface has been mounted on the outer side.

The aim of the invention is to present a simple and more effective actuator that can react promptly at changes of temperature and which does not require an extra temperature sensor that has thermal contact with the wax cartridge or has a slitting or slotted extended actuator cover constructed in one piece with the capsule cap outside the area of the thermal expansion substance.

According to the invention this is solved in that the capsule of the actuator has an oblong cuplike sensor body the surface of which is at least partly deformed in such a way that its surface is increased. Consequently, an increased contact surface with the surrounding medium is achieved in a simple manner securing a fast response by the actuator.

Preferably the deformations are carried out in the sensor body before filling the cup with wax. Hereby it is possible to make the deformations in the same operation as by the manufacturing of the cup.

Advantageously the sensor body has a peripheral part and an end part on that side of the actuator which is turned away from the activation stem, and the deformations are formed on a surface of the peripheral part.

In an advantageous and simple embodiment the peripheral part has an oval or a cylindrical shape.

The deformations are carried out most favorably in at least two areas on the surface of the sensor body, a non-deformable area then remains where e.g. stamping for adjustment of the actuator can take place. A similar adjustment is well-known and takes place, in that the sensor body is placed in a medium having a predetermined adjusted temperature, for example 20° C. The sensor tube is then pinched by means of for example pincers so that the inner sensor area is reduced and the activator pin of the sensor body gets a predetermined protruding length.

The deformations can thus be obtained by external knurling, turning, pressing, cold forming, hot stamping or rotary swaging, whereby a number of lengthwise grooves or slotted twists on the surface of the sensor body are created. Hereby the external surface is effectively increased. By means of the slotted twists it is secured that parts of the water flow stay a longer time near the external surface of the cup, whereby a better thermal contact is achieved.

The above mentioned large sensor body surface which was reached through its long shape and deformations certainly means quicker response; however, the quantity of wax that registers a change in temperature is considerable. A certain inertia in the actuator's way of responding can therefore often be registered.

To solve this problem surface increasing deformations can be made on the inner surface of the sensor body, which faces the expansion substance.

The inner side can for example be provided with lengthwise grooves or an inner thread in the sensor cup. Hereby a better thermal contact between the sensor body and the thermal substance is achieved. This deformation can be done by turning, pressing, cold forming, hot stamping, rotary swaging, knurling and drifting.

A substantial decrease in the response time is achieved when the sensor body carries surface increasing deformations on the external surface as well as on the internal surface side of the sensor cup.

In such a combination of obtaining a considerable area of thermal contact between the medium and the metal surface of the sensor cup and between the inner side of the sensor cup and the wax, an effective contribution to the achievement of a quickly responding actuator is obtained.

In a further embodiment of the invention a filler body is placed centrally inside the sensor body of the actuator, between its end and the diaphragm. The quantity of the expansion substance is hereby reduced. Heating of the expansion substance will be more quick, corresponding to a fast response by the actuator.

By using a filler body the wax is placed in a peripheral zone inside the sensor body. The average distance to heat the wax is thereby shorter resulting in a shorter response time.

In a simple manner the filler body is screwed, clipsed or firmly assembled into the sensor cup.

The filler body is preferably made from a heat conductive material, for example a metal like brass. If the diameter of the brass body is increased the average heating distance is shorter. A larger body diameter may be suitable when the filler is of metal, especially brass, as a good thermal conductor secures a short heating time. The filler body can be made by a turning, stamping, cold forming or hot swaging operation.

Another improvement can be obtained when the filler body is a thermal conductor in the form of a star-shaped body which is arranged inside the metal cup with the star arms resting against the inner side of the sensor cup. Hereby the heat is carried in the middle of the wax. The average distance to heat the wax is equidistant.

Advantageously the filler may consist of a non-conducting material, e.g. plastic. Then the filler body may be made by plastic moulding or turning.

Thereby the actuator is more rapidly cooled off as, compared to a filler body of metal, less heat is stored in a plastic filler.

Embodiments of the invention will now be described with reference to enclosed figures.

FIG. 1 is partly a longitudinal section of a first embodiment of the invention.

FIG. 2 is a sectional view along line II—II in FIG. 1.

FIG. 3 is a side view of the embodiment according to FIG. 1.

FIG. 4 is a sectional view along line IV—IV in FIG. 3.

Figure 5:
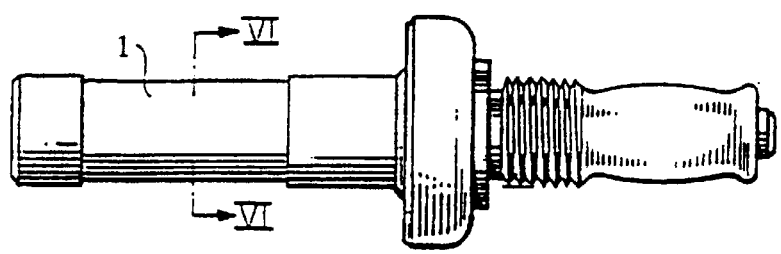
FIG. 5 is a side view of a second embodiment of the invention.
Figure 6:
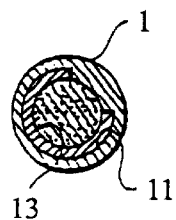
FIG. 6 is a cross sectional view along line VI—VI in FIG. 5.

FIG. 6' is a cross sectional view along line VI—VI in FIG. 5 showing a modified form.

Figure 7:
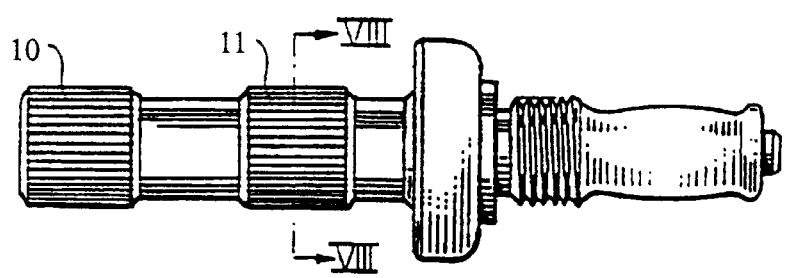

FIG. 7 is a side view of a third embodiment of the invention.

Figure 8:
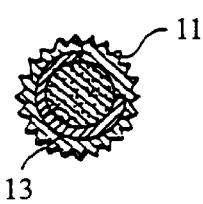

FIG. 8 is a cross sectional view along line VIII—VIII in FIG. 7.

FIG. 8' is a cross sectional view along line VIII—VIII in FIG. 7 showing a modified form.

Figure 9:
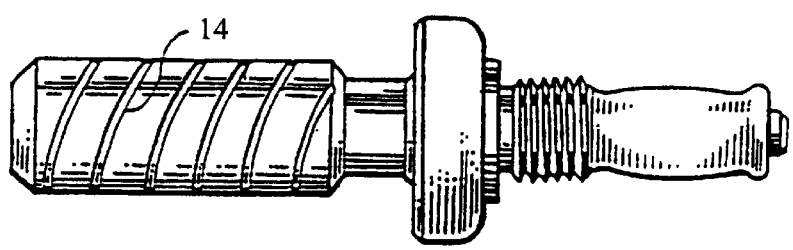

FIG. 9 is a side view of a fourth embodiment of the invention.

Figure 10:
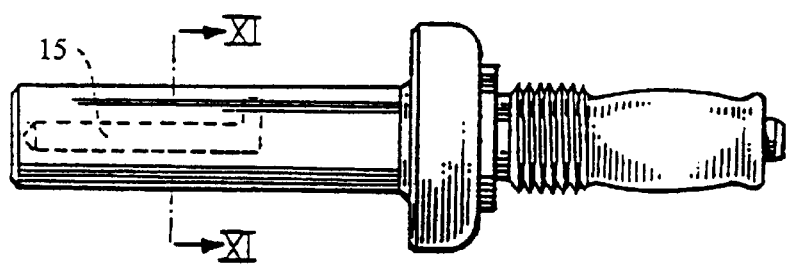

FIG. 10 is a schematical side view of a fifth embodiment of the invention.

Figure 11:
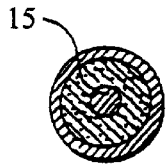

FIG. 11 is a cross sectional view along line XI—XI in FIG. 10.

Figure 12:
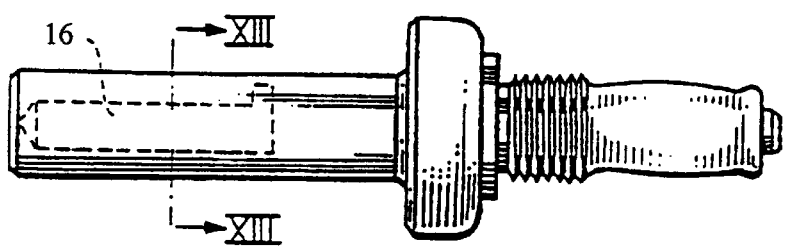

FIG. 12 is a schematical side view of a sixth embodiment of the invention.

Figure 13:
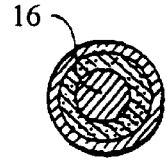

FIG. 13 is a sectional view along line XIII—XIII in FIG. 12.

FIG. 14 is a schematical side view of a seventh embodiment of the invention.

FIG. 15 is a cross sectional view along the line XV—XV in FIG. 14.

FIG. 16 is a schematical side view of a eighth embodiment of the invention and

FIG. 17 is a sectional view along line XVII—XVII in FIG. 16.

FIG. 17' is also a sectional view along line XVII—XVII but showing a modified form.

The thermal actuator according to the invention operates as a thermostat in a thermostatically controlled valve such as a thermostatically controlled mixing valve of the known art. The actuator includes a stem, which is given different positions according to the temperature of the mixed medium and since the stem is contacting the mixing valve its valve elements will be controlled by the stem. Now described operation is well known art.

FIG. 1 shows an actuator according to one embodiment of the invention. The actuator consists of an oblong cuplike sensor body 1, which is closed at the left end by a wall 2. A diaphragm 4 is inserted from the right end. The cudlike body 1 is filled with a thermal expansion substance like wax 5. The right end of the actuator consists of a hollow cover means 6, through which a stem 7 is extended and guided. The cover is attached to the sensor body 1 by flanging. The left end of the stem is inserted in the diaphragm 4 and the right end extends through the hollow cover means 6 and outside a certain distance. Thus, the right end of the stem can contact the mixing valve, not shown. When the thermal expansion substance is heated, it will press the diaphragm 4 to the right due to the expansion of the substance. The diaphragm 4 will thus move the stem to the right. When the substance is chilled it will contract and the stem 7 is moved to the left due to an external force, which is normally applied in this direction, not shown. What is described above is according to the known art.

According to the invention the capsule, which contains the thermal expansion substance, consists of an oblong cuplike sensor body 1. The sensor body is rather big and contains a great amount of thermal expansion substance like wax. In order to design the sensor body 1 so that the actuator reacts promptly on the change of temperature, the surface of the sensor body is at least partly deformed in such a way that its thermal transmittance area is increased. Such deformations 8 and 9 are shown in FIG. 1. As can be seen, the deformations 8 are formed in a left peripheral part of the body 1 and deformations 9 are formed in a right peripheral part of the body. Thus, a non-deformed area remains in the middle part of the body, the cross section of which being shown in FIG. 2. The deformations 8 and 9 have increased material thickness and are formed so that several of fins will be arranged lengthwise and around the peripheral area of the outside of the body. FIG. 3 shows fins 10 and 11 on the outside of the body. These fins will increase the transmittance of heat from outside of the body 1 to the inside of the body, which means that the wax quickly will assume the temperature of the mixed medium outside the sensor body 1.

As also can be seen from FIG. 1 and 2, a filler body 12 is placed centrally inside the sensor body 1 between its left end 2 and the diaphragm 4. The average distance to heat the wax will hereby be shorter. The filler body 12 is preferably of metal, for example brass.

FIG. 3 shows a side view of the actuator according to FIG. 1 but in a smaller scale. FIG. 4 shows a section along the line IV—IV in FIG. 3. The fins 10 and 11 are formed on the peripheral outside of the body on two different areas having extended outside diameters and increased material thickness.

A further embodiment of the invention is shown in FIGS. 5 and 6. FIG. 5 shows a side view of the actuator and FIG. 6 is a section along line VI—VI in FIG. 5. The deformations are made in the inside of the body 1 and are in form of inside thread 13. The internal exchange surface of the body will hereby be larger. FIG. 6' shows a modification of FIG. 6 having inside fins instead of a thread.

FIGS. 7 and 8 show still a further embodiment of the invention. This embodiment is a combination of the embodiments according to FIG. 3 and FIG. 5. Thus, there are external fins or knurles 10 and 11 on the outside of the body and there is also internal thread 13 as shown in the section according to FIG. 8, which is a section along the lines VIII—VIII in FIG. 7.

A modified form is shown in FIG. 8', in which instead of internal threading internal fins or knurles may be used.

FIG. 9 shows still a further embodiment of the invention. Hereby the external deformations are in form of twists 14 on the outside of the body 1. The twists can be multiple threads. Hereby the water flow will stay a longer time on the external side of the body and thus increase or decrease the temperature of the body much quicker.

FIG. 10 shows schematically a further embodiment of the invention and FIG. 11 is a sectional view according to line XI—XI of FIG. 10. The filler body 15 is of plastic and placed inside the sensor body 1 as according to what is shown in FIG. 1. The average distance to heat the wax will hereby be shorter.

FIG. 12 and 13 show an embodiment similar to the one according to FIGS. 10 and 11. The diameter of the filler body 16 is larger than the one of the filler body 15. The average distance to heat the wax is hereby shorter. The best thermal conduction will be achieved when the filler body 16 is a leading material, e.g. brass.

In FIGS. 14 and 15 a third embodiment of the filler body is shown. The filler body 17 has a star-shaped section form. It can be seen from FIG. 15 that the star-shaped filler body 17 is in the form of a central pipe 18. Longitudinal flanges 19 are directed radially from outside of the pipe 18 to the inside of the sensor body 1. FIG. 15 shows eight flanges 19. By this embodiment of the filler body the heat is carried by the flanges 19 into the middle of the wax. The average distance to heat the wax is equidistant.

In FIG. 16 there is shown schematically a combination of the embodiments of FIG. 5 and FIG. 12. FIG. 17 is a section view along line XVII—XVII of FIG. 16. Thus, there is a filler body 16 placed in the center of the sensor body 1 and inside threading 13 is arranged on the inside of the sensor body 1. In a modified form shown in FIGS. 17' internal fins or knurles may be used instead of threading.

What is claimed is:

1. Thermal actuator including a capsule, which contains a diaphragm controlling the position of an actuation stem and a thermal expansion substance, and which operates as a thermostat the capsule being placed in a medium for transmitting heat of the medium to the thermal expansion substance, the capsule consisting of an oblong cuplike sensor body having a longitudinal surrounding wall, which is at least partly provided with surface increasing deformations such that a thermal transmittance area is increased.

2. Thermal actuator according to claim 1, wherein said surrounding wall has an oval or a cylindrical shape.

3. Thermal actuator according to claim 1, wherein said deformations are provided in at least two different areas on a surface of the sensor body.

4. Thermal actuator according to claim 1, wherein said deformations are made by external knurling in the form of lengthwise grooves forming fins between the grooves on a surface of the sensor body.

5. Thermal actuator according to claim 4, wherein said surrounding wall is provided with said surface increasing deformations on an external as well as on an internal surface thereof.

6. Thermal actuator according to claim 1, wherein an inner surface of the surrounding wall is provided with said surface increasing deformations.

7. Thermal actuator according to claim 6, wherein the deformations of said inner surface are lengthwise slots or threads.

8. Thermal actuator according to claim 1, wherein a filler body is placed centrally inside the sensor body between its end and the diaphragm.

9. Thermal actuator according to claim 8, wherein the filler body is screwed, clipped or firmly assembled into the sensor body.

10. Thermal actuator according to claim 9, wherein the filler body (17) is part of or consists of a central body having a star shaped form and is arranged inside the metal sensor body with star-arms resting against an inner side of the sensor body.

11. Thermal actuator according to claim 8, wherein the filler body is of metal.

12. Thermal actuator according to claim 8, wherein the filler body is thermally connected with an inner side of the surrounding wall by metal connections.

13. Thermal actuator according to claim 8, wherein the filler body is made of non-conductive material.

* * * * *